United States Patent
Kismarton

(10) Patent No.: US 12,049,048 B2
(45) Date of Patent: Jul. 30, 2024

(54) METHOD FOR HIGH RATE PRODUCTION OF COMPOSITE LAMINATE STRUCTURES

(71) Applicant: The Boeing Company, Chicago, IL (US)

(72) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/814,992

(22) Filed: Jul. 26, 2022

(65) Prior Publication Data

US 2024/0034006 A1  Feb. 1, 2024

(51) Int. Cl.
*B29C 70/34* (2006.01)
*B29C 70/54* (2006.01)
*B29L 31/30* (2006.01)

(52) U.S. Cl.
CPC ............ *B29C 70/34* (2013.01); *B29C 70/545* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 8,354,156 B2 | 1/2013 | Taketa et al. | |
| 8,906,494 B2 | 12/2014 | Wadahara et al. | |
| 10,604,633 B2 | 3/2020 | Ogasawara et al. | |
| 10,808,091 B2 | 10/2020 | Taketa et al. | |
| 10,960,615 B2 * | 3/2021 | Shaw | B29C 70/54 |
| 10,994,502 B2 | 5/2021 | Modin et al. | |
| 2009/0166467 A1 | 7/2009 | Hagman et al. | |
| 2010/0028593 A1 | 2/2010 | Taketa et al. | |
| 2010/0233424 A1 | 9/2010 | Dan-Jumbo et al. | |
| 2013/0095282 A1 | 4/2013 | Taketa et al. | |
| 2017/0368815 A1 | 12/2017 | Blom-Schieber | |
| 2019/0275753 A1 | 9/2019 | Kendall et al. | |
| 2020/0139649 A1 | 5/2020 | Modin et al. | |

OTHER PUBLICATIONS

Office Action, dated May 22, 2023, regarding U.S. Appl. No. 17/814,996, 17 pages.
Kismarton, "Prepreg Charge Optimized for Forming Contoured Composite Laminate Structures," U.S. Appl. No. 17/814,996, filed Jul. 26, 2022, 47 pages.
Final Office Action, dated Oct. 25, 2023, regarding U.S. Appl. No. 17/814,996, 24 pages.
Notice of Allowance dated Jan. 10, 2024, regarding U.S. Appl. No. 17/814,996, 8 pages.
European Patent Office Extended Search Report, dated Dec. 5, 2023, regarding Application No. EP23172430.3, 6 pages.

* cited by examiner

*Primary Examiner* — Barbara J Musser
(74) *Attorney, Agent, or Firm* — Yee & Associates, P.C.

(57) ABSTRACT

Multi-ply composite charges are laid up by a multi-head laminator in a single pass, enabling high rate production of composite laminate structures such as stringers.

19 Claims, 18 Drawing Sheets

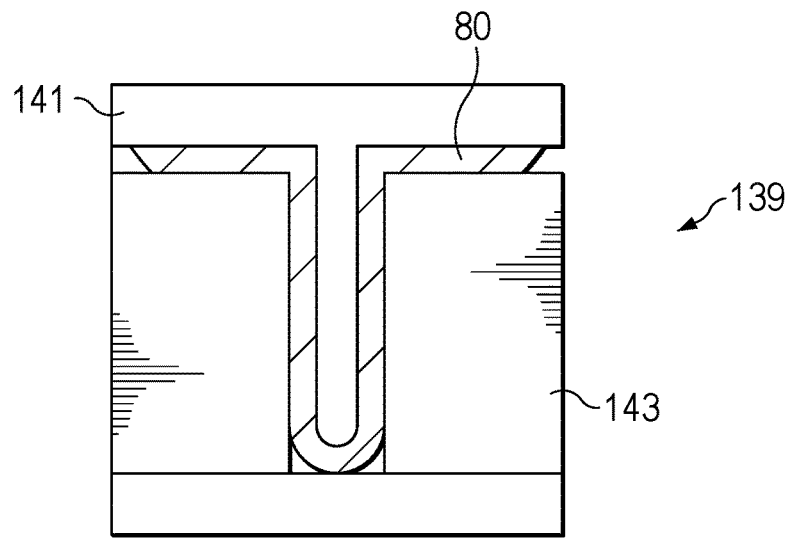
FIG. 21
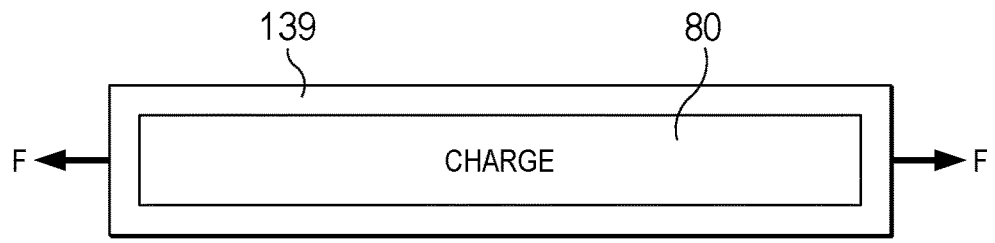
FIG. 22
140 — LAY UP A STACK OF FIBER PREPREG PLIES BY LAYING DOWN STRIPS OF PREPREG TAPE ON TOP OF EACH OTHER OVER A SUBSTRATE USING A PLURALITY OF TAPE HEADS SUCH THAT SUCH ALL OF THE PLIES OF THE STACK ARE LAID UP SIMULTANEOUSLY
FIG. 23

METHOD FOR HIGH RATE PRODUCTION OF COMPOSITE LAMINATE STRUCTURES

BACKGROUND INFORMATION

1. Field

The present disclosure generally relates to processes and equipment used to form composite structures, and deals more particularly with a method and apparatus for high rate production of charges used to form composite laminate structures.

2. Background

Composite laminate structures such as stiffeners are used throughout the aircraft, marine and other industries. For example, composite laminate stringers having any of various cross sectional shapes are used in the fuselage and wings of airplanes. These stringers often have one or more contours or other out-of-plane features along their lengths.

Composite laminate stiffeners can be made by compression forming a flat stack of composite plies, sometime referred to as a charge, between a pair of dies matching the desired stringer shape. This technique, sometimes referred to as "punch forming", is problematic when producing contoured stringers because of the tendency of the plies in contoured areas to wrinkle or buckle during the forming process. The flat charge is produced either by hand layup or using automated equipment, both of which build the charge ply-by-ply. These techniques are both costly and relatively slow, and therefore not well-suited high volume production.

Accordingly, there is a need for a method and apparatus for producing charges used to form composite laminate structures that are highly efficient and therefore well suited for high rate production environments.

SUMMARY

The disclosure relates in general to composite structures, and more specifically to a method and apparatus for high rate production of charges used to form composite laminate stringers.

According to one aspect, an apparatus is provided for laying up a flat composite charge. The apparatus comprises a laminator including a plurality of tape heads arranged in series and mounted on supporting frame.

According to another aspect, a method is provided of making charges used to form composite structures. The method comprises laying up a stack of fiber prepreg plies by laying down strips of fiber prepreg tape on top of each other simultaneously in a row over a substrate using a plurality of tape heads.

According to a further aspect, a method is provided of making composite charge used to form composite laminate structures. The method comprises laying up at least first and second stacks of fiber prepreg plies simultaneously. The method includes laying down strips of fiber prepreg tape on top of each other in a row by moving a group of tape heads over first and second substrates, wherein the group of tape heads begin to lay up the second stack of plies while simultaneously completing laying up the first stack of plies.

According to another aspect, a method is provided of making a contoured composite laminate structure. The method comprises predicting loads on the composite structure along its length, and generating a ply schedule based on the predicted loads. The ply schedule includes plies having differing fiber orientations, including determining the contribution of each of the plies in the ply schedule required to meet the loads. The method also includes determining an amount of stretching of each of the plies in the ply schedule required for forming the plies into the desired structure shape without ply wrinkling. The method further includes selecting a length of the fibers in each of the plies representing an optimized combination of structure strength and formability. The method also includes laying up the flat stack of the plies in accordance with the ply schedule, and forming the flat stack of plies into the desired structure shape.

According to a further aspect, a method is provided of making a composite charge used to form a composite structure. The method comprises laying up a stack of fiber prepreg plies by laying down strips of fiber prepreg tape on top of each other on substrate, and compacting the strips of fiber prepreg tape in series as the strips of fiber prepreg tape are being laid down.

One of the advantages of the disclosed method and apparatus is that multi-ply composite charges can be laid up more quickly. Another advantage is that labor costs of laying up flat composite charges can be reduced. A further advantage is that flat composite charges can be produced that are well suited for forming highly contoured composite laminate stiffeners that are tailored along their length to meet local load demands or other requirements. A further advantage is that flat composite charges can be produced that can be formed into contoured laminate stringers with minimal or no ply wrinkling. Still another advantage is that flat composite charges can be produced in sections that are later joined together.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 21 is an illustration of a cross-sectional view of matched dies used to stretch form a flat composite charge into a desired stringer shape.

FIG. 22 is an illustration of a diagrammatic view showing how a composite charge is stretch formed to reduce ply wrinkling.

FIG. 23 is an illustration of a flow diagram of a method of making a charge used to form a composite laminate structure.

DETAILED DESCRIPTION

Figure 1:
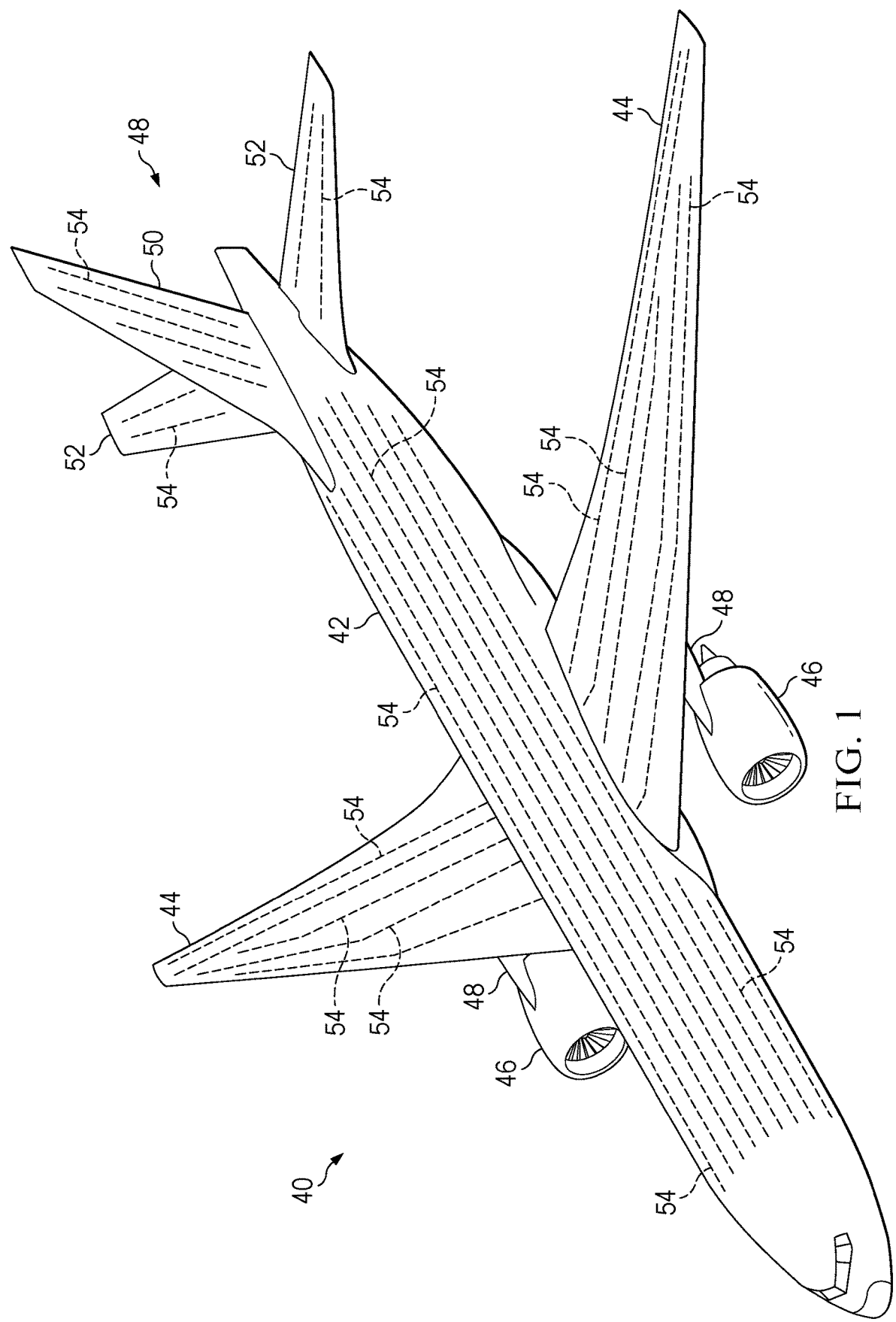
FIG. 1 is an illustration of a perspective view of an airplane in which the location of stringers is indicated by broken lines.

Referring first to FIG. 1, an airplane 40 has airframe components 38 including a fuselage 42, wings 44 and an empennage 48 comprising a vertical stabilizer 50 and horizontal stabilizers 52. Engines 46 are suspended from the wings 44 by pylons 56. Each of the airframe components 38 includes an outer skin 53 that is reinforced and stabilized by stiffeners such as stringers 54, comprising a composite laminate such as a carbon fiber reinforced polymer (CFRP). Each of the stringers 54 may have any of a variety of cross sectional shapes, such as, without limitation, I, J, Y, Z, and hat shapes. The stringers 54 are joined to the IML (inner mold line) of the outer skin 53, typically by co-curing or by co-bonding.

Figure 2:
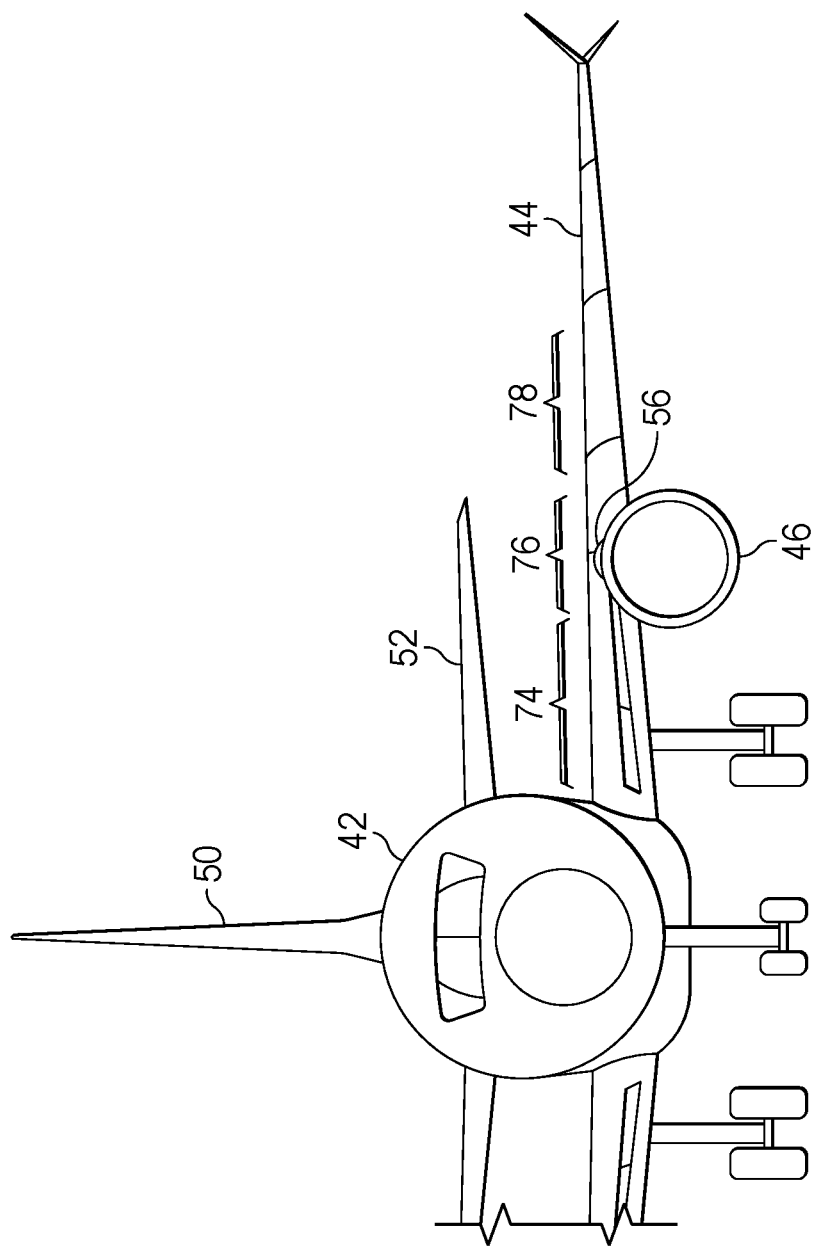
FIG. 2 is an illustration of a fragmentary, front elevational view of the airplane shown in FIG. 1.

The nature of the loads carried by the stringers 54 is different than those carried by the outer skin 53 and other components such floor beams and control surfaces (both not shown), making stringers 54 unique in their design and production. The design and production of stringers 54 used in airplanes can be particularly challenging because they are seldom straight, but rather comprise differing sections that are contoured and tailored to suit local conditions and/or structural geometries. For example, referring to FIG. 2, an inboard section 74 of a wing 44 possesses a curvature that requires the stringers 54 in this section to be similarly curved. An intermediate section 76 of the wing 44 that supports the weight of a pylon 56 and engine 46 may require ramps, pad ups or other out-of-plane features in the stringers 54 in order to carry added loads. An outboard section 78 of the wing 44 may include internal components (not shown) that require that the stringers 54 in this section have joggles or unique features. The loads that a stringer 54 may be required to react in the inboard section 74, as well as the intermediate section 76, and also the outboard section 78 of the wing 44 can be quite different, consequently it is often necessary to tailor the stringer 54 along its length to meet local load conditions in the inboard section 74, the intermediate section 76, and the outboard section 78.

Figure 3:
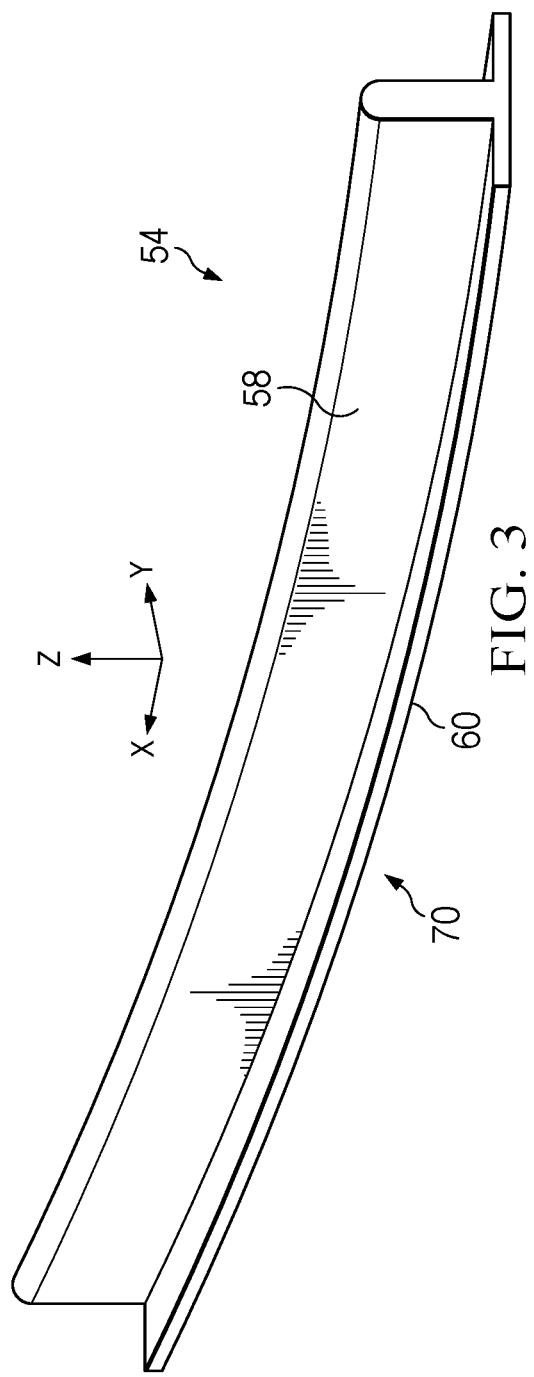
FIG. 3 is an illustration of a perspective view of a curved blade stringer.
Figure 4:
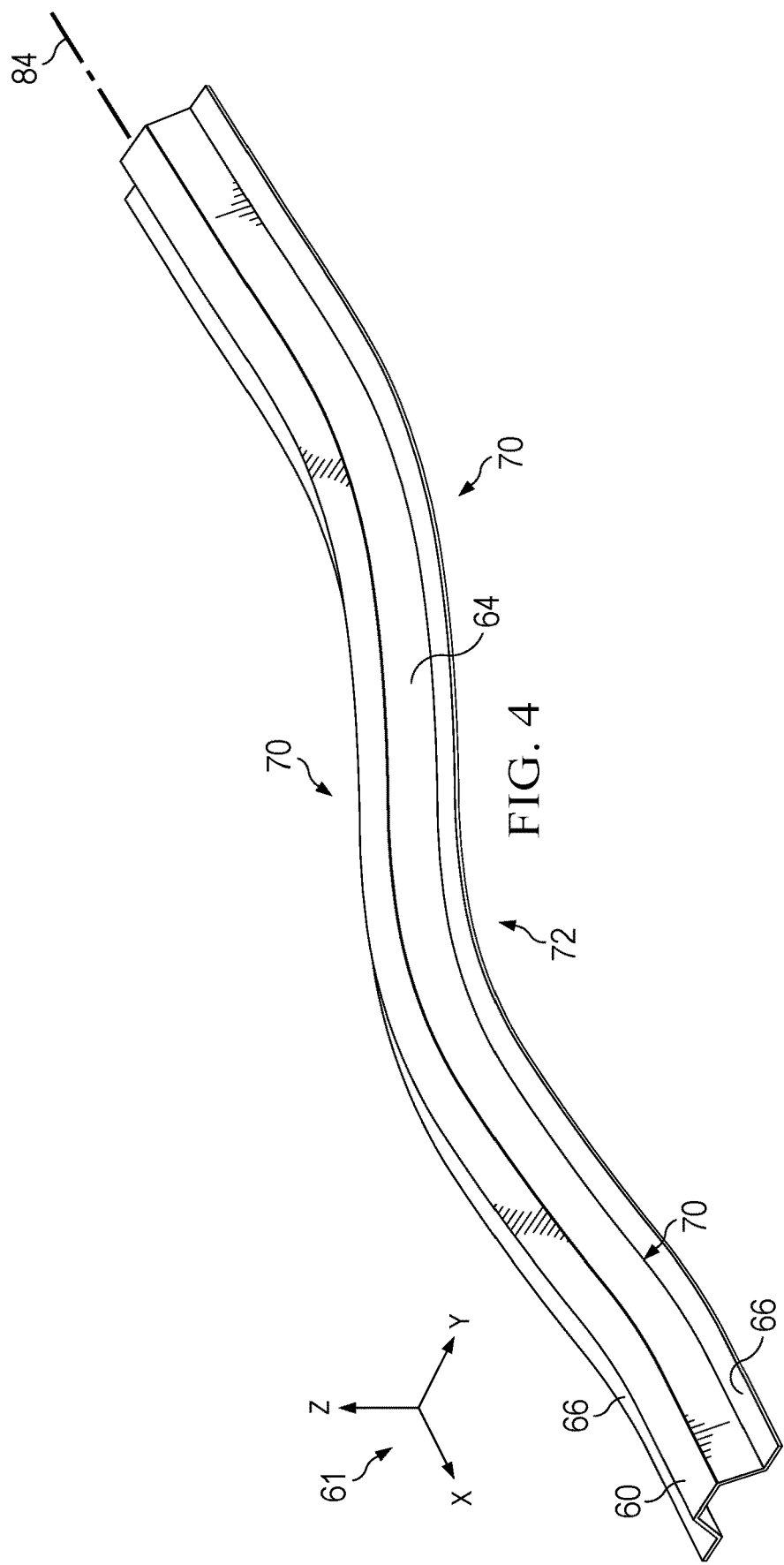
FIG. 4 is an illustration of a perspective view of a hat stringer having both ramp and joggle sections.
Figure 5:
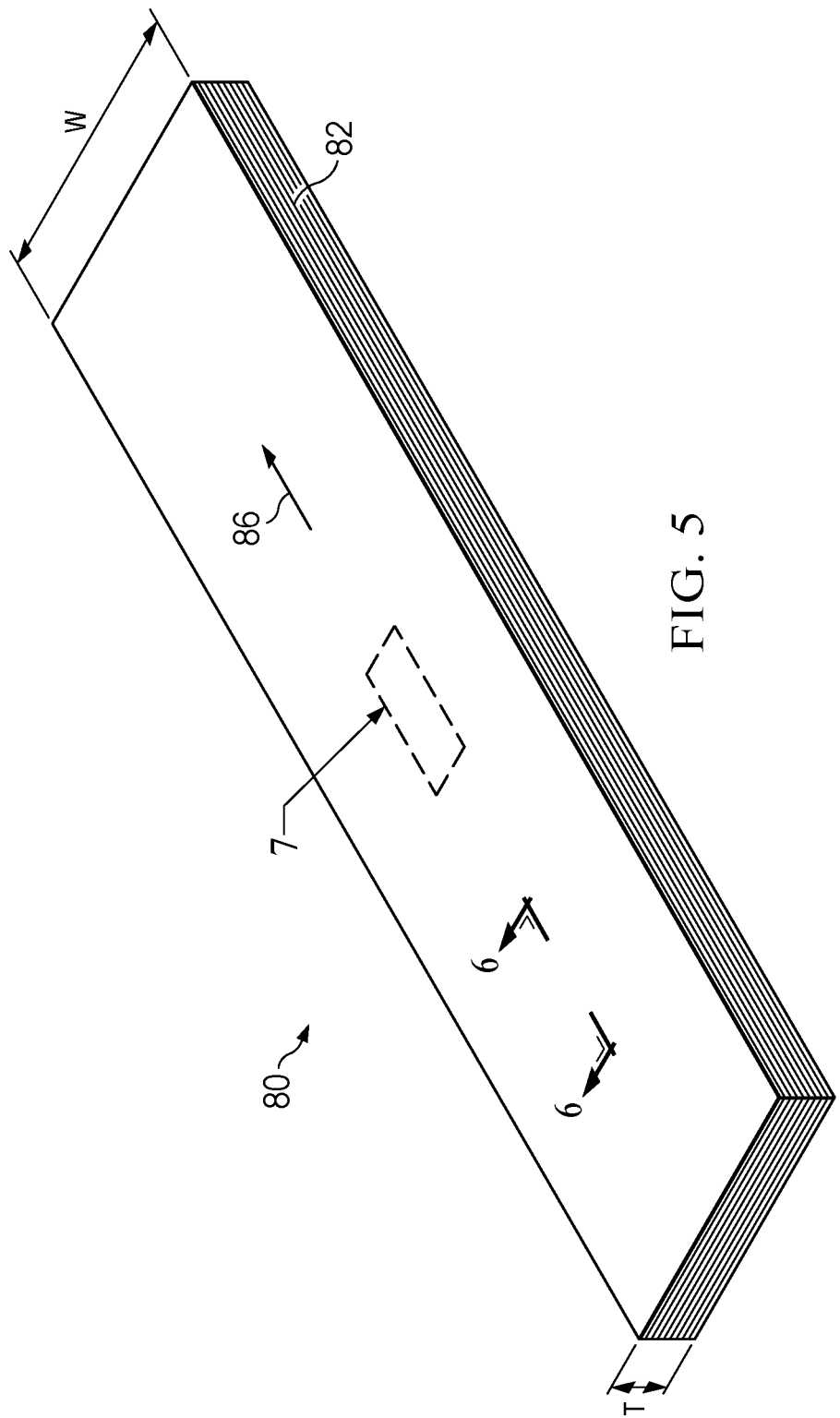
FIG. 5 is an illustration of a perspective view of a flat, multi-ply, highly formable composite charge.
Figure 6:
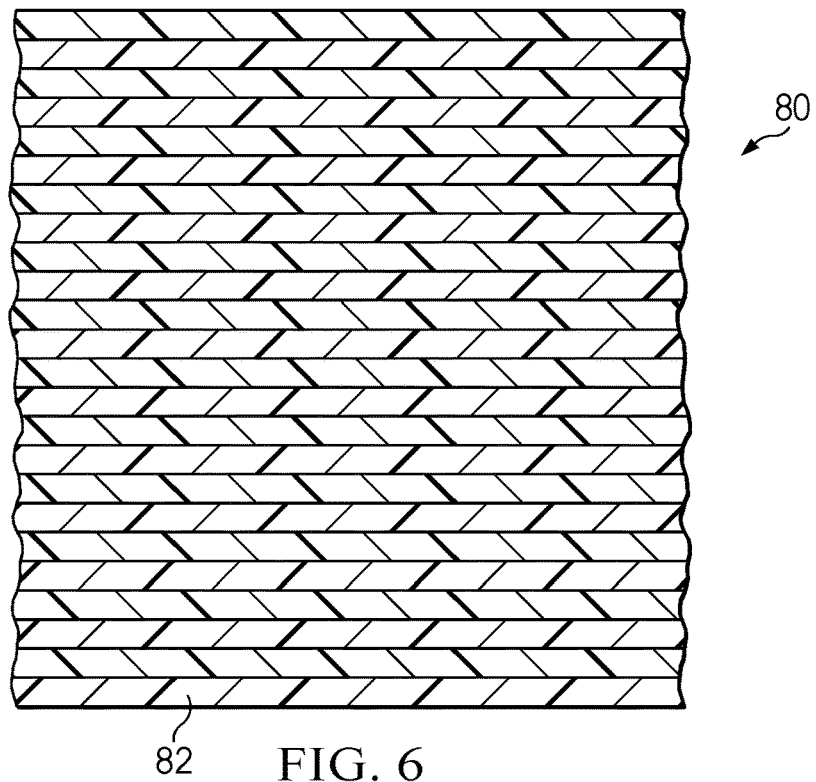
FIG. 6 is an illustration of a sectional view taken along the line 6-6 in FIG. 5.

As indicated above, a stringer 54 may have any of a variety of out-of-plane features at differing sections along its length. As used herein, "contoured" and "contoured stringer" refer to a stringer having one or more out-of-plane features or sections, including but not limited to ramps, pad-ups, curvatures and/or joggles. FIGS. 3 and 4 illustrate stringers 54 that are contoured and have typical out-of-plane features. For example, referring to FIG. 3, a stringer 54 such as that used in the wings 44 of the airplane 40 shown in FIGS. 1 and 2 comprises a blade 58, sometimes referred to as a web, and a flange or cap 60 that is configured to match contours of the outer skin 53 to which the cap 60 is to be attached. In this example, the stringer 54 has a curvature 70 along its entire length in the XZ plane within coordinate system shown at 61, however in other examples the stringer 54 may have straight sections as well as other local contours or out-of-plane features along its length.

Referring now to FIGS. 5-9, composite laminate structures such as the stringers 54 described above can be produced by forming a charge 80, sometimes referred to herein as a ply stack, to the desired shape. The charge 80 is formed of a composite and may be flat. The tendency of a composite charge to wrinkle or buckle during the forming process due to the presence of out-of-plane features can be reduced or eliminated by optimizing the plies of the charge in the manner described below. Highly formable flat charges comprising optimized plies can be laid up quickly and efficiently using the method and apparatus described later in this description. During layup of the charge, the plies can be tailored along the length of the charge to meet local load demands and other requirements in the inboard section 74, the intermediate section 76, and the outboard section 78 of a wing other area of the airplane 40.

The charge 80 comprises an optimized stack of plies 82, each of which comprises fibers 92 held in a polymer matrix that provide unidirectional reinforcement. The fibers 92 may comprise carbon, fiberglass, Kevlar® or other suitable fibers, while the polymer matrix may comprise a suitable thermoset or thermoplastic, or a hybrid material system containing both a thermoset and a thermoplastic, depending on the application. The plies 82 may have various fiber orientations relative to a reference direction 86, such as the longitudinal axis 84 (FIG. 4) of the stringer 54 to be formed using the charge 80. In some examples, each of the plies 82 comprises fiber prepreg tape having a width that is equal to the width W of the charge 80 (FIG. 5), and a thickness T that is suitable for the application. The plies 82 of the charge 80 are laid up using a later discussed automated tape laying laminator that lays up all of the plies 82 of the charge 80 on top of each other substantially simultaneously, thereby contributing to production efficiency. The charge 80 can be formed to the desired shape by any of several techniques, including compression "punch" forming, LASH forming or stretch forming, to name only a few.

Figure 7:
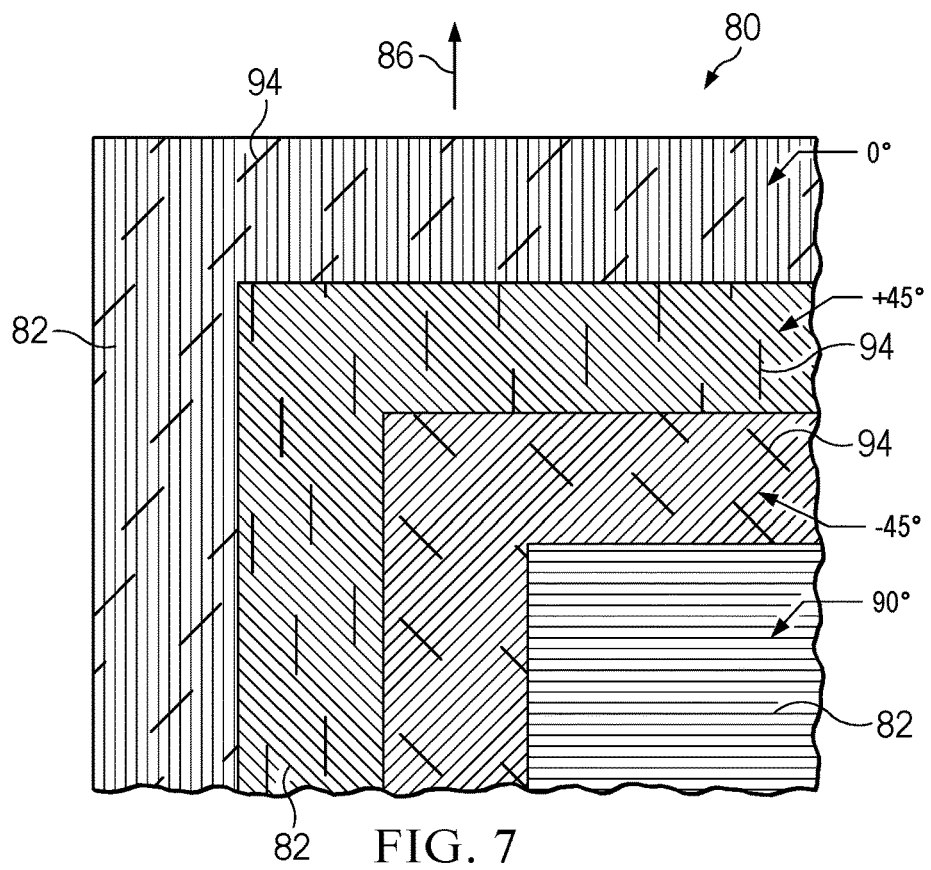
FIG. 7 is an illustration of a fragmentary plan view showing several of the plies of the composite charge in the area designated as "FIG. 7" in FIG. 5.

The plies 82 of the charge 80 are laid up as a flat stack according to a predetermined ply schedule which determines the number of plies 82 and the fiber orientation of each of the plies 82. For example, as shown in FIG. 7, a charge 80 may be formed of any number of 0°, +45°, −45°, and 90° plies (only 4 plies of the charge are shown). Each of the 0°, +45° and −45° plies 82 is provided with a pattern of angled cuts 94 therein, which sever the fibers 92 in those plies 82 and form ply segments 96 (FIG. 9) each having a length L1. The spacing between the angled cuts 94 determines the length of the fibers 92 in the ply segment 96. As will discussed below in more detail, the length of the fibers 92 and the angle of the angled cuts 94 relative to the fiber direction 88 are selected in a manner that optimizes the formability of the charge 80 without materially reducing the performance of the stringer 54, including its strength. In the illustrated example, the 90° plies do not contain angled cuts 94 because they can readily stretch longitudinally in the reference direction 86 during forming of the charge 80. However, in some examples, the 90° plies may contain cuts angled 94 for other reasons. It should be noted here that fiber angles (0°, ±45°, 90°) of the charge 80 used in this description are merely exemplary. A range of other fiber angles may be used, depending upon the application. For example, a different set of fiber angles may be required in applications where there is an emphasis on weight reduction.

Figure 8:
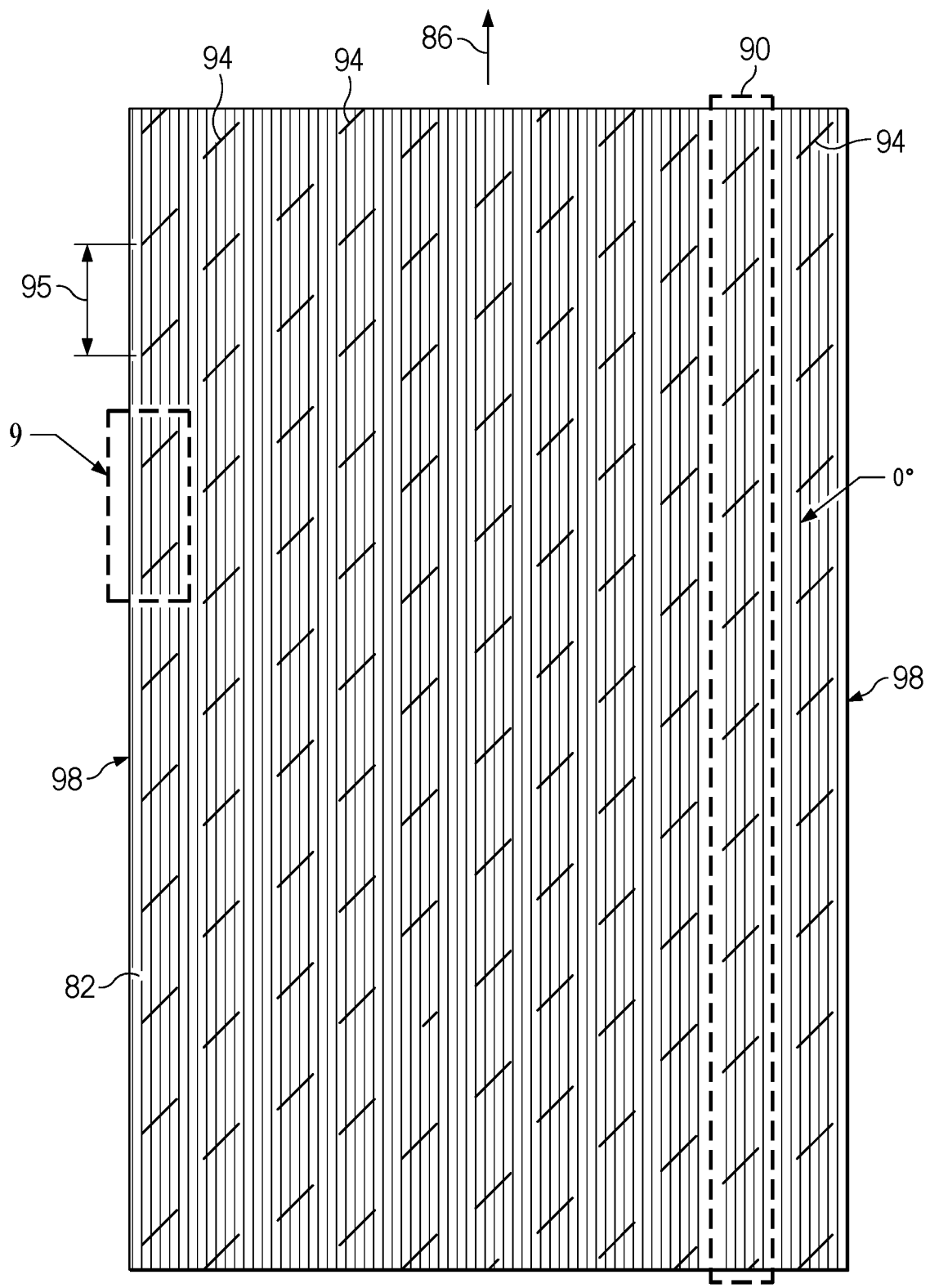
FIG. 8 is an illustration of a plan view of a 0° ply having angled cuts that are staggered relative to each other.
Figure 9:
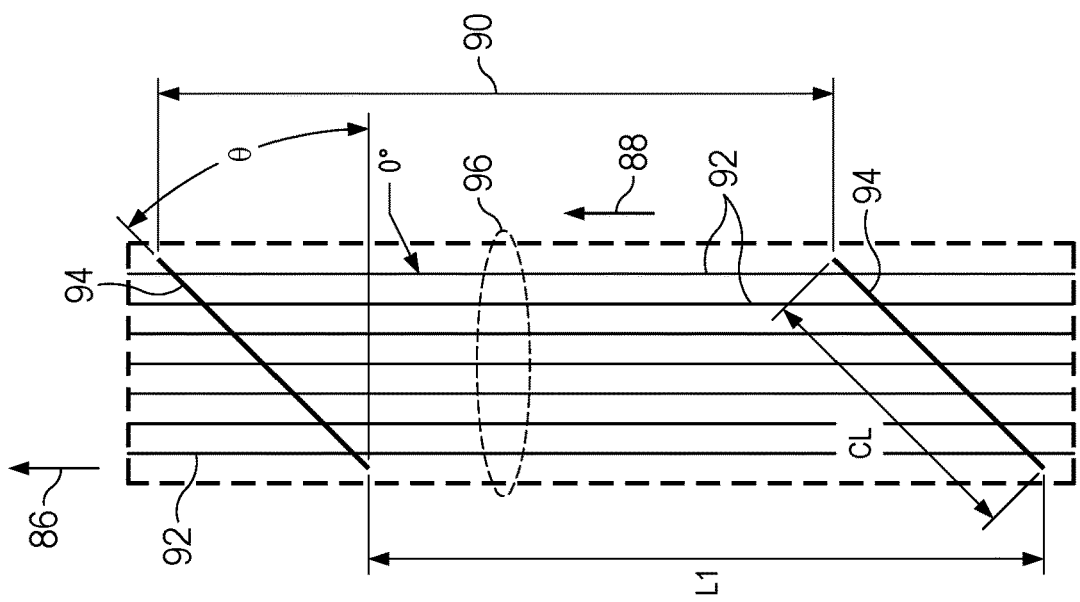
FIG. 9 is an illustration of the area designated as "FIG. 9" in FIG. 8.

FIGS. 8 and 9, illustrate a 0° ply having one suitable pattern of angled cuts 94. The angled cuts 94 are arranged in columns 90 that are staggered relative to each other a suitable distance 95 (FIG. 8). The fibers 92 of the 0° plies are aligned with the reference direction 86, and the angled cuts 94 in each column 90 are spaced apart from each to form groups of fibers 92 that will be referred to as ply segments 96. Each ply segment 96 contains fibers 92 having a length L1 that is determined by the longitudinal spacing between the angled cuts 94. Generally, it is desirable that the length L1 is as long as possible, providing that the desired formability can be achieved, because loads are transferred through the stringer 54 primarily along the X-axis (FIGS. 3 and 4), i.e. in the reference direction 86. However, in sections of the stringer 54 having tighter contours, such as along curvatures within the XZ plane, the fiber lengths L1 may need to be shorter in order to allow the ° plies to stretch to a greater degree, and thereby allow them to better conform to contours.

As best seen in FIG. 9, each of the angled cuts 94 forms an angle θ with respect to the direction of the fiber 92. The length L1 is determined by the spacing between the angled cuts 94, and the angle θ Will depend upon the application, and more particularly on the load conditions, geometry and out-of-plane features at differing locations along the length of the stringer 54. In one stringer example, L1 is between approximately 10 inches and approximately 20 inches, while angle θ is in the range of approximately 10° to approximately 30°. In another example, L1 is approximately 20 inches, and angle θ is approximately 15°. Generally, it has been found that cuts at an angle θ Of 15°, although severing the reinforcing fibers, minimizes any reductions in the strength of the stringer 64, sometimes referred to as strength "knockdown", in those areas where the fibers 92 are cut. Moreover, the use of angled cuts 94 at a 15° angle in combination with the pattern of angled cuts 94 disclosed herein, reduces any potential problems with removing the backing paper (not shown) on the fiber prepreg tape, particularly along the edges 98 of the plies 82, as the plies 82 are being laid up by the automated laminator.

Figure 10:
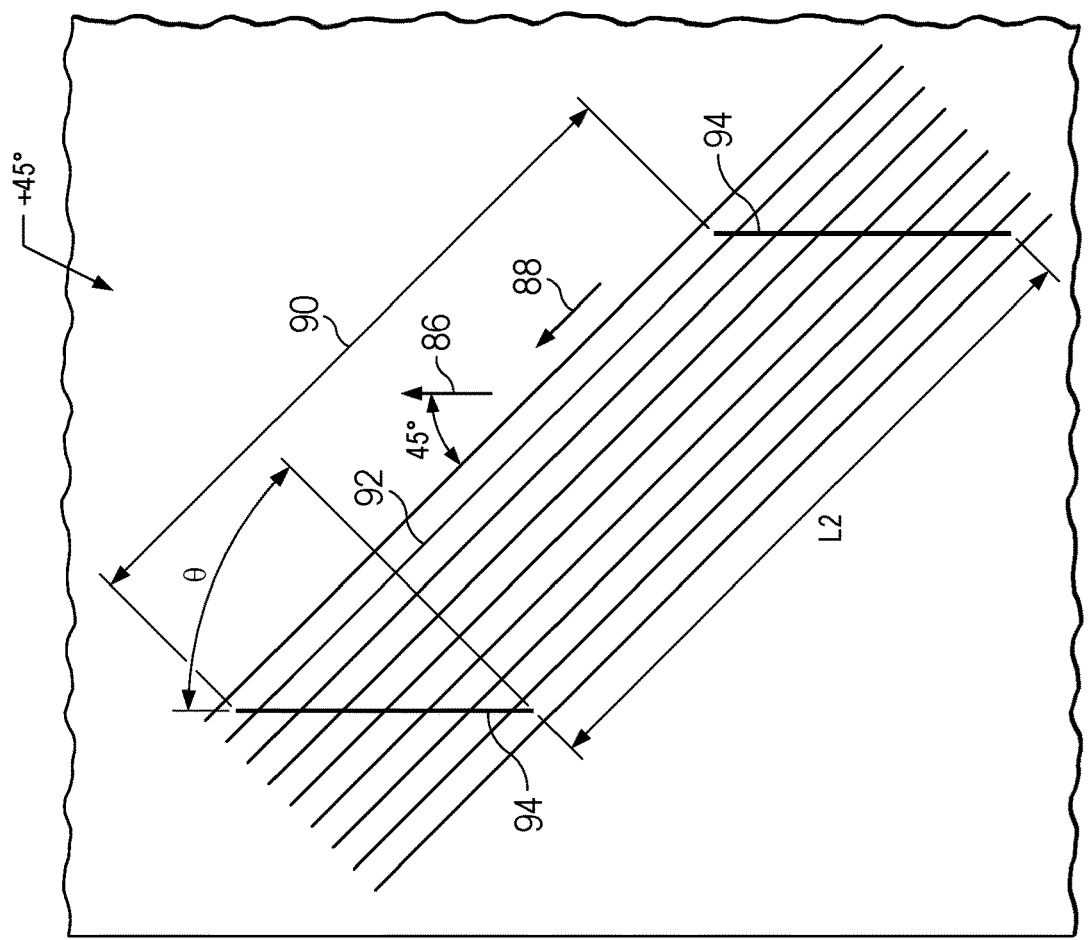
FIG. 10 is an illustration similar to FIG. 9 but showing a section of a +45° ply.

Referring to FIG. 10, the fibers 92 in the +45° plies are oriented at a 45° angle relative to the reference direction 86, and the fibers 92 in the ply segments 96 formed by the angled cuts 94 have a length L2. The angled cuts 94 form an angle θ relative to the fiber directions 88 in the +45° plies. Both the length L and the angle θ depend on the application and more particularly on the load conditions, geometry and out-of-plane features at differing locations along the length of the stringer 54. In one example, L2 is between approximately 2 inches and approximately 4 inches, and el is in the range of approximately 10° to approximately °. In another example, L2 is approximately 2 inches, and el is approximately 15°. The length L2 and angle θ for the −45° plies are substantially the same as those for the +45° plies. Generally, L2 may need to be at the lower end of the range mentioned above in those areas where the stringer 54 is highly contoured within the YZ plane since the 45° plies need to stretch transversely a greater amount in this areas. In the case of a stringer 54 having ramps, the +45° and −45° fibers need to be shorter, typically in the range of 2 to 4 inches long, because there is a need for a greater amount of ply stretching in the ramps but a reduced need for strength compared to the 0° plies which primarily carry the loads along the X-axis.

The fiber lengths L1, L2 and the cut angle θ are optimized for each stringer configuration to allow forming of the charge 80 to a desired contour at various sections along the length of the stringer 54 with minimal or no ply wrinkling. The need for providing the charge 80 with the ability to stretch during forming is particularly important in those sections of the stringer 54, such as ramps, that have compound curvatures. Optimization of the fiber lengths L1 and L2 involves a selection process representing a balance between strength and formability in each ply direction (0°, +45°, −45°).

It should be noted here that while some sections of the charge 80 have angled cuts 94 to provide the necessary formability due to stringer contours, angled cuts 94 in other sections of the stringer 54, such as straight sections, may not be required because those sections can be formed to shape without wrinkling. During the forming process, the angled cuts 94 in the 0° plies permit the fibers in those plies to separate slightly and move apart longitudinally in the reference direction 86, allowing the ply to stretch and bend within the XZ plane (FIGS. 3 and 4) without wrinkling. However, the fiber length L1 is sufficient to maintain the strength necessary to carry loads on the stringer 54 at each section along its length. In a similar manner, the angled cuts 94 in the +45° and −45° plies allow the fibers 92 in those plies to move apart slightly in the transverse direction, allowing the +45° and −45° plies to stretch and bend as necessary in the YZ plane without wrinkling during the forming process.

Figure 11:
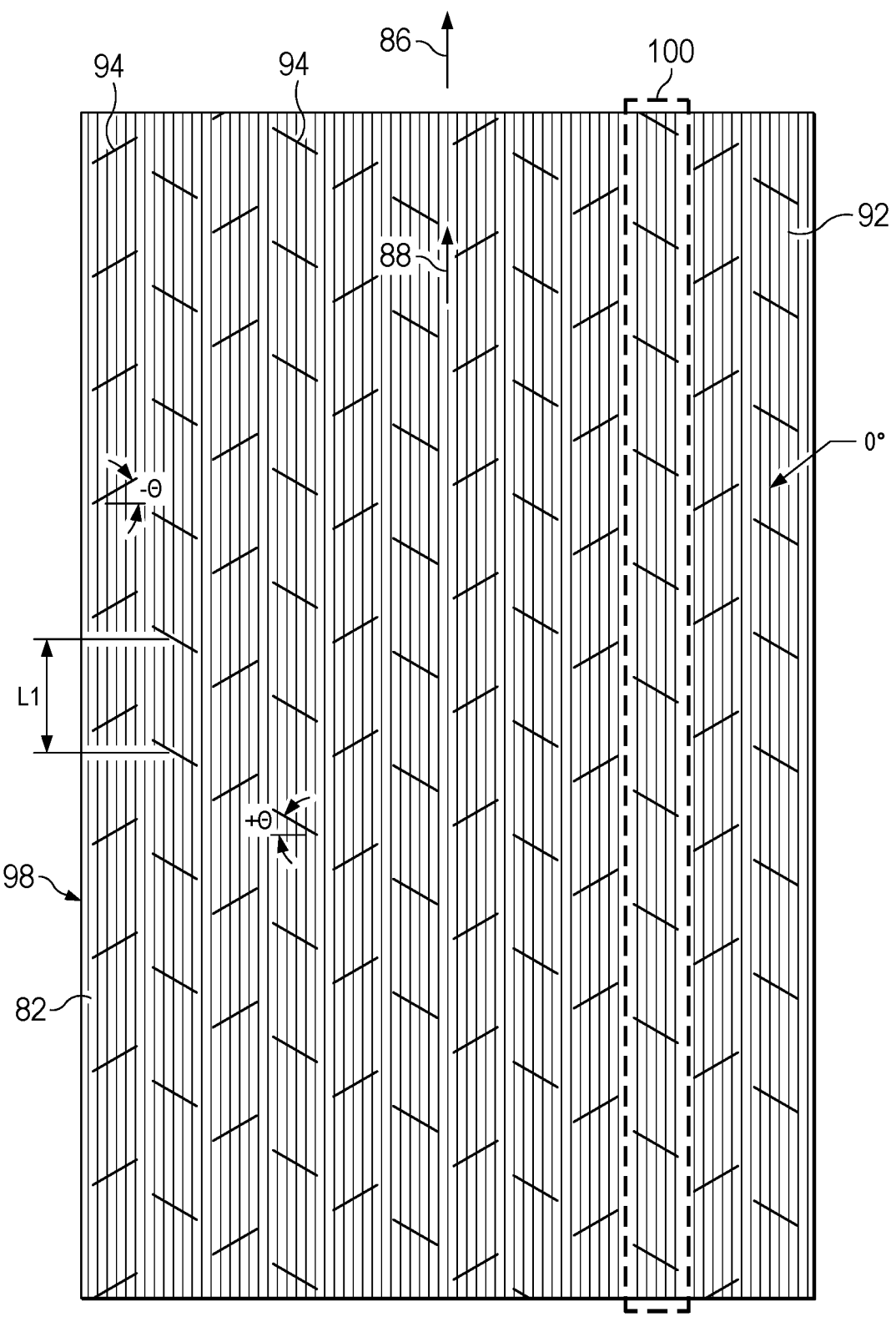
FIG. 11 is an illustration similar to FIG. 8, but wherein the angled cuts in adjacent columns are arranged at opposite angles.
Figure 12:
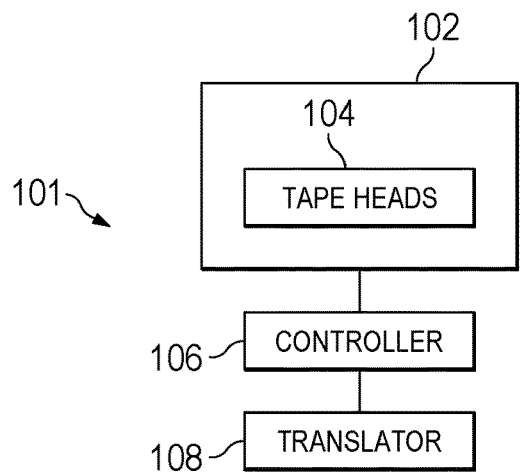
FIG. 12 is an illustration of a functional block diagram of an apparatus for high rate production of flat composite charges.
Figure 13:
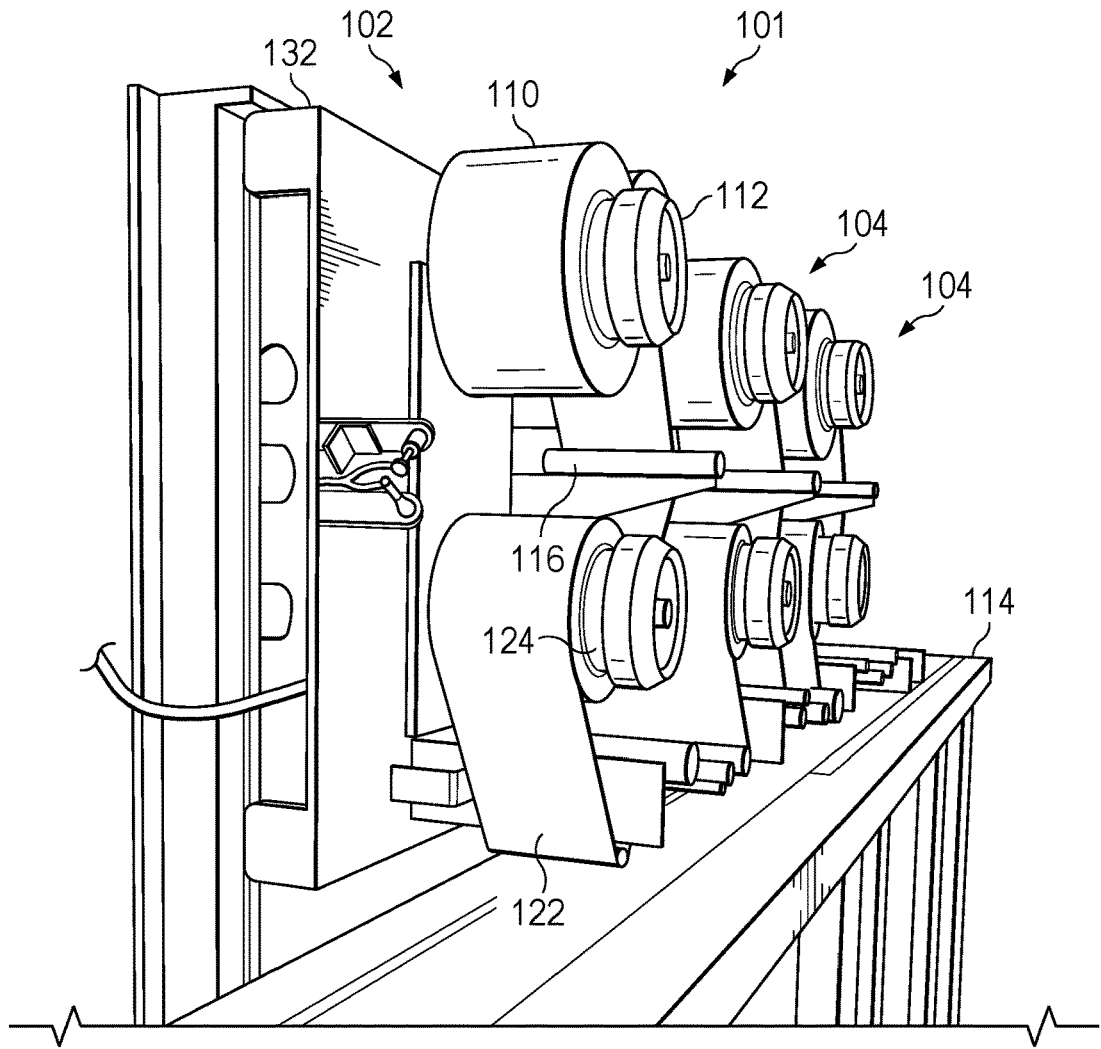
FIG. 13 is an illustration of a perspective view of a laminator forming part of the apparatus of FIG. 12.

The pattern of angled cuts 94 in the example shown in FIG. 8 is merely illustrative of a wide range of cut patterns that are possible. The particular pattern of angled cuts 94 chosen will depend upon the application, including the loading and other requirements of various sections of the stringer 54 along its length. In some examples, the angled cuts 94 may be randomly distributed over the area of each of the plies 82. FIG. 11 illustrates a 0° ply having another example of a pattern of angled cuts 94. In this example, the angled cuts 94 in alternate columns 100 are arranged at two opposite angles, +θ, −θ relative to the fiber direction 88. In other words, the angles of the angled cuts 94 are reversed in alternate columns 100 and are staggered relative to each other. Staggering the angled cuts 94 disperses them, thereby reducing strength knockdown. This alternating arrangement of the angled cuts 94 minimizes the reduction in load carrying capacity of the 0° plies caused by the cuts. The angles of the angled cuts 94, as well as the length L1 of the cut fibers 92 are similar to those described earlier in connection with the example shown in FIGS. 8 and 9. A similar arrangement of alternating cut angles can be used in the 45° plies (not shown) where the cut angles +θ, −θ as well as the cut fiber lengths L2 will be similar to those described above in connection with the example shown in FIG. 10.

As previously noted, the description above illustrates the use of a charge 80 suitable for forming stringers 54, however similar design principals, which will be described in greater detail below, can be used to produce any of a wide variety of composite laminate components such as those used in the airframe of the airplane 40. Each application requires optimization of a series of parameters, including but not limited to fiber angles, fiber length in each fiber direction, cutting patterns, manufacturability considerations of the chosen cutting pattern and the strains encountered when forming the charge 80 to a desired shape. The angled cuts 94 determine the fiber lengths in each fiber direction. Shorter ply segments 96 (fiber lengths) are more easily formed, but may have reduced strength, while longer ply segments 96 may be less formable but result in higher strength.

The cutting pattern selected determines the fiber length as well as the distribution of the angled cuts 94. Also, appropriate consideration is given to the distribution of the cuts. For example, if all of the angled cuts 94 are located in a single, unique location in the charge 80, the strength of the structure will be lower than if the cuts are fully disbursed through the volume of the charge 80 and/or disbursed through the area of each of the plies 82. Thus, a cut pattern should be selected that disburses the angled cuts 94 over the area of each of the plies 82.

As noted above, consideration must be given to the manufacturability of the chosen cutting pattern. The exit angle of the angled cut 94 relative to the direction in which the backing paper is removed significantly affects whether the backing paper is drawn away without snagging or leaving bits of paper on the prepreg. Any bits of backing paper left on the prepreg constitute FOD (foreign objects and debris) which will require removal, which not only adds to production costs, but may result in rejection of the part because it fails inspection. Furthermore, the chosen cutting pattern may also determine the type and design of the equipment used to produce the angled cuts. Some types of equipment designs may not be feasible to produce or may be prohibitively expensive for a particular application or production environment. Other equipment choices, while effective, may not be sufficiently efficient for high rate production.

As indicated earlier, designing a charge for a particular application requires careful consideration be given to the strains that result from forming the charge to particular shapes for a given application. Each application, such as skins, stringers, floor beans, floor panels and control surfaces for airplanes require different amounts of forming which produce different amounts of strains that require consideration when designing the charge. For example, some components such as floor panels are relatively flat, and may not require that any of the fibers in the plies of the charge be cut. Other components such as stringers, may be only slightly contoured but are required to possess a high degree of strength, thus giving rise to unique design considerations. In the case of wing stringers, the curvature of the stringers follows that of the curvature of the wing, which typically is on the order of a radius of 1000 inches. Thus, in the case of a wing stringer, it has been found that in order to maintain the necessary stringer strength while allowing forming of the charge to the necessary wing curvature, the fibers in the 0° plies of the charge should be cut to lengths in the range of approximately 10 to 20 inches. Fiber lengths that are longer than the high end of this range reduce the formability of the charge and increase the possibility of ply wrinkling which results in strength knockdown. However, fiber lengths that shorter than the low end of this range reduce the strength of the stringer below an acceptable level.

As described above, the fibers in the 0° plies 82 are cut to lengths between 10 and 20 inches to allow the 0° fibers 92 to stretch and allow the charge 80 to be formed to the curvature of the wing 44 along its length. In those locations where the stringer 54 must conform to out-of-plane features such as ramps on the outer skin 53 where the outer skin 53 thickens, forming the charge 80 into the shape of the ramps is dominated by shearing of the 45° fibers 92, rather than their extension as in the case of the 0° fibers 92. Consequently, the fibers 92 in the 45° plies 82 must stretch transversely considerably more than the 0° plies 82 must stretch to accommodate wing curvature. In order to achieve the necessary transverse stretch, the 45° fibers are cut to a shorter length, within the range of 2 to 4 inches, but only in those particular areas of the stringer 54, e.g. the ramps, were a high degree of transverse stretching (shearing) is necessary during forming without ply wrinkling. Although the ° fibers 92 are cut to a length that is much less than the ° fibers 92, any knockdown in strength of the stringer 54 is minimal and therefore acceptable because the primary loads on the stringer 54 are carried by the 0° plies 82, rather than the 45° plies 82. As discussed earlier, in areas of the stringer 54 that are not curved or have out of plane features, the fibers 92 in the plies 82 of the charge 80 in those areas need not be cut since those plies 82 are not required to stretch as the charge 80 is being formed to the desired stringers shape.

Attention is now directed to FIGS. 12-16, which illustrate apparatus 101 for high rate of production of charges 80, optimized as previously described connection with FIGS. 5-11. The apparatus 101 comprises a laminator 102, and a translator 108, both of which are operated by a controller 106. The controller 106 may comprise a suitable PC, PLC (programmable logic controller), or one or more digital processors. The translator 108 may comprise any suitable mechanism for moving the laminator 102 and a substrate 114 relative to each other. In one example, the substrate 114 comprises a stationary table or work platform, and the translator 108 comprises a mechanism that moves the laminator 102 on a supporting frame 132 along a linear path or common axis 130 (FIG. 16) over the substrate 114. In another example, the laminator 102 can be an end effector mounted on an articulated arm or gantry type robot (not shown). Other arrangements are possible that would allow the supporting frame 132 to be moveable relative to the substrate 114 along a common axis 130.

Figure 16:
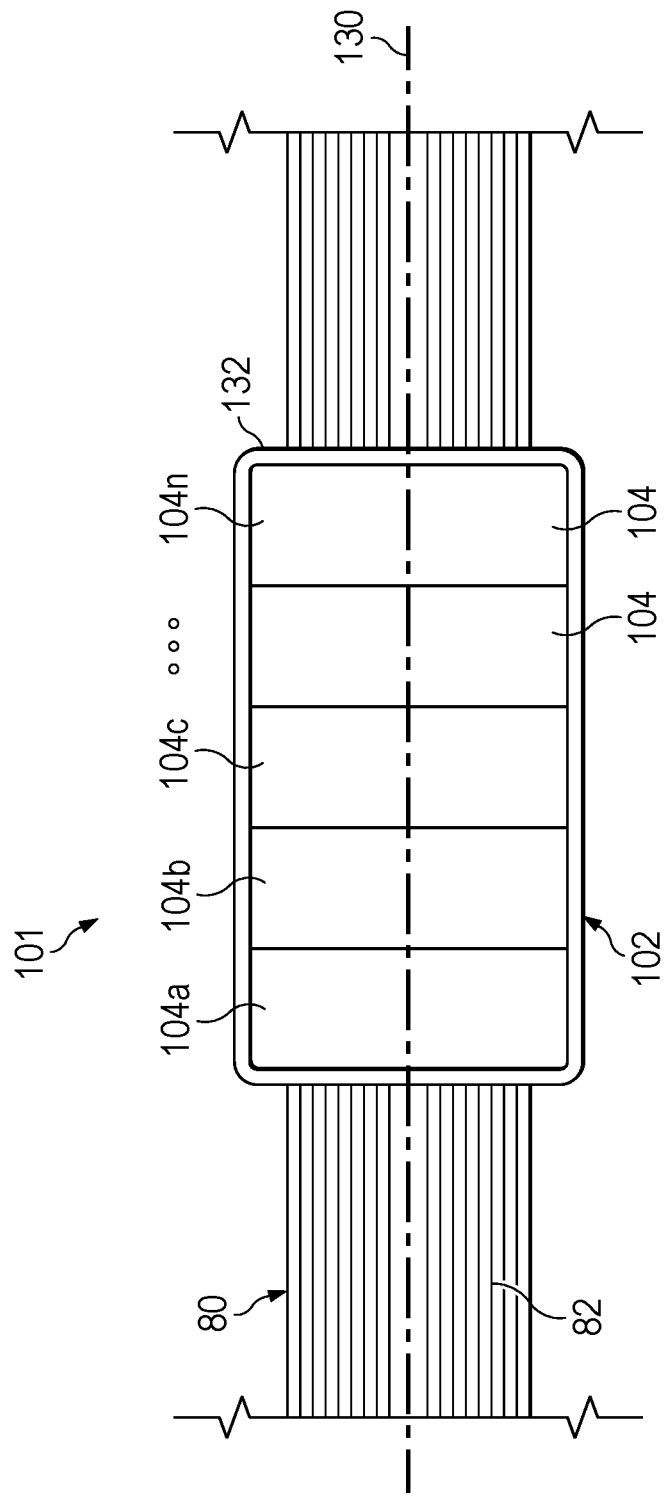
FIG. 16 is an illustration of a diagrammatic top view showing the linear path of travel of the laminator over the substrate.

The laminator 102 comprises a plurality of tape laying heads (hereafter "tape heads") 104 that are mounted as a group on a supporting frame 132. The tape heads 104 are arranged in series with each other, aligned along a common axis 130 (FIG. 16). Each of the tape heads 104 is operable to lay down a strip of fiber prepreg tape 110 (hereinafter "tape") on the substrate 114, or on an underlying layer of the tape 110. The width of each of the strips of tape 110 may be equal to the width of the plies. Consequently, each strip of the fiber prepreg tape 110 can form a single one of the plies 82 of the charge 80. As a result, in one example, the number of tape heads 104 used is equal to the number of the plies 82 specified in the particular ply schedule for the stringer or other structure that will be formed using the charge 80. The tape heads 104 are arranged in series (87) and are spaced from each other along a common axis 130 (FIG. 16) such that each of the tape heads 104 lays down a strip of the tape 110 immediately ahead of a strip of the tape 110 being laid down by adjacent tape head 104. Each of strip of the tape 110 is a unidirectional fiber prepreg forming one of the plies 82 of the charge 80, some of which may have angled cuts 94 therein forming a series of ply segments 96 (FIG. 9) of predetermined lengths. As previously discussed, the angled cuts 94 allow the charge 80 to stretch longitudinally and/or transversely as needed, as the charge 80 is being formed to a desired stringer contour, thereby reducing or eliminating ply wrinkling due to contours.

The tape heads 104 are mounted on a common, supporting frame 132 and therefore move together as group over the substrate 114 in a linear direction of travel 128, and simultaneously lay down and compact strips of tape 110 on top of each other, in succession, one after another in a row 115, thereby laying up all of the plies 82 of the charge 80 simultaneously. In other words, all of the tape heads 104 are laying down strips of the tape 110 at the same time in a row 115 as the laminator 102 moves over the substrate 114. As a result, all of the plies 82 of the charge 80 can be laid up in a single pass or "stroke" of the laminator 102.

As will be explained below, each of the tape heads 104 lays down strips of the tape 110 by removing a backing paper 122 from the strips of tape 110, feeding strips of the tape to a compactor 126, compacting the strips, and cutting the strips to a desired length. Each of the tape heads 104 includes a supply of the tape 110 carried on a supply reel 112. Each tape head 104 is load with tape having a particular fiber orientation, e.g. 0°, ±45°, 90°. The tape 110 includes a layer of removable backing paper 122, which prevents the tape 110 from sticking together on the reel 112 because of the prepreg's tack. The tape 110, along with the backing paper 122 is fed through one or more guides 116 to a compactor 126 such as a compaction roller or similar compaction device. The compactors 126 of the tape heads 104 are aligned with each other along the common axis 130. A suitable cutter 118 cuts the tape 110 to the desired length. The backing paper 122 is drawn off of the tape 110 by a take-off roller 120 and fed to a take-up reel 124 where it is accumulated and can be periodically discarded. The arrangement described above results in the backing paper 122 being removed from the tape 110 before the tape 110 is fed to the compactor 126 and compacted over the substrate 114 or an underlying one of the plies 82. Consequently, the backing paper 122 is not compacted against the tape 110 by the compactor 126 which could increase adhesion of the backing paper 122 to the tape 110 and lead to bits of the backing paper 122 remaining on the ply segments 96 as FOD, particularly along the edges 98 (FIG. 8) of the tape 110.

Figure 14:
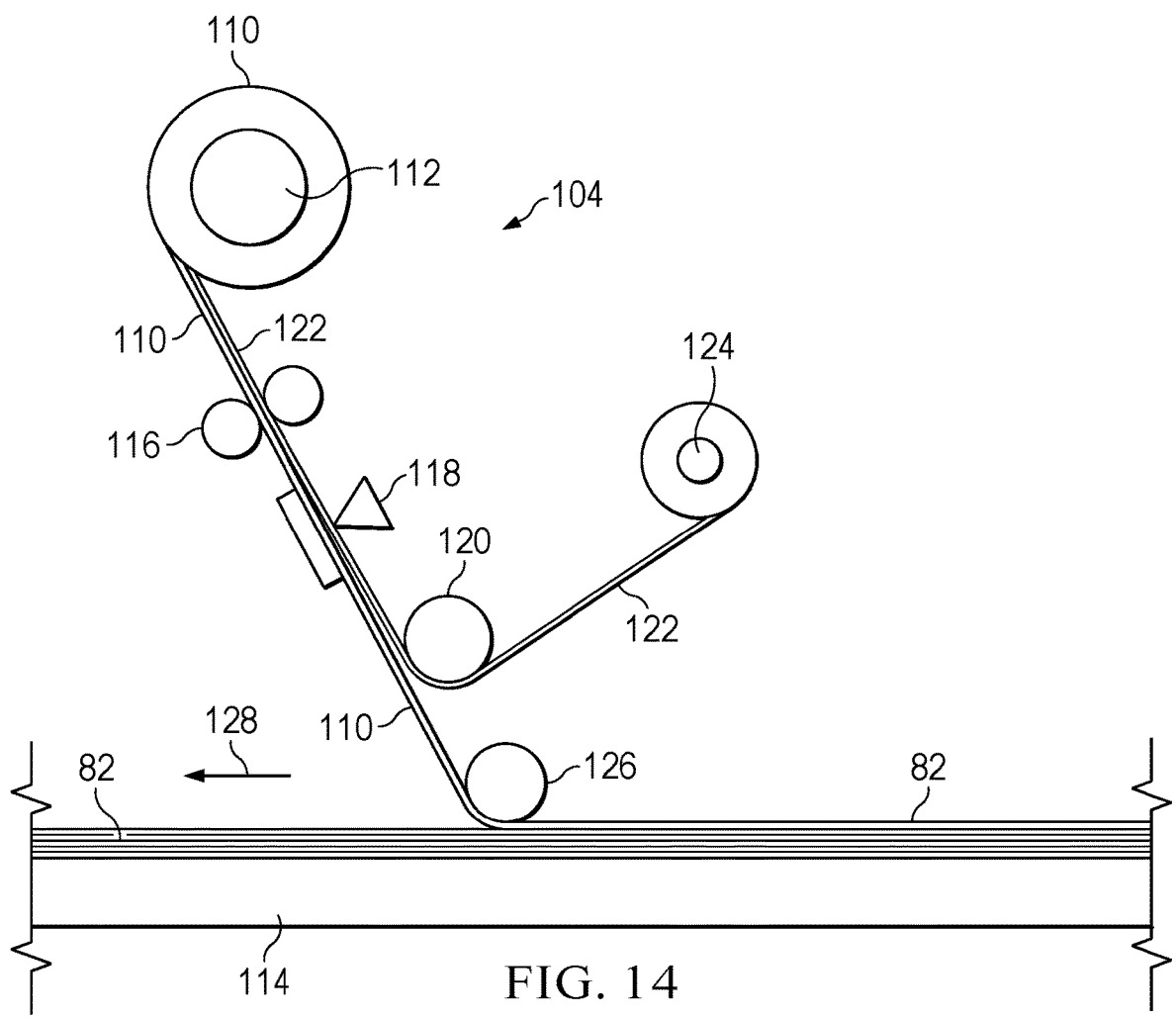
FIG. 14 is an illustration of a diagrammatic side view of a tape head forming part of the laminator.
Figure 15:
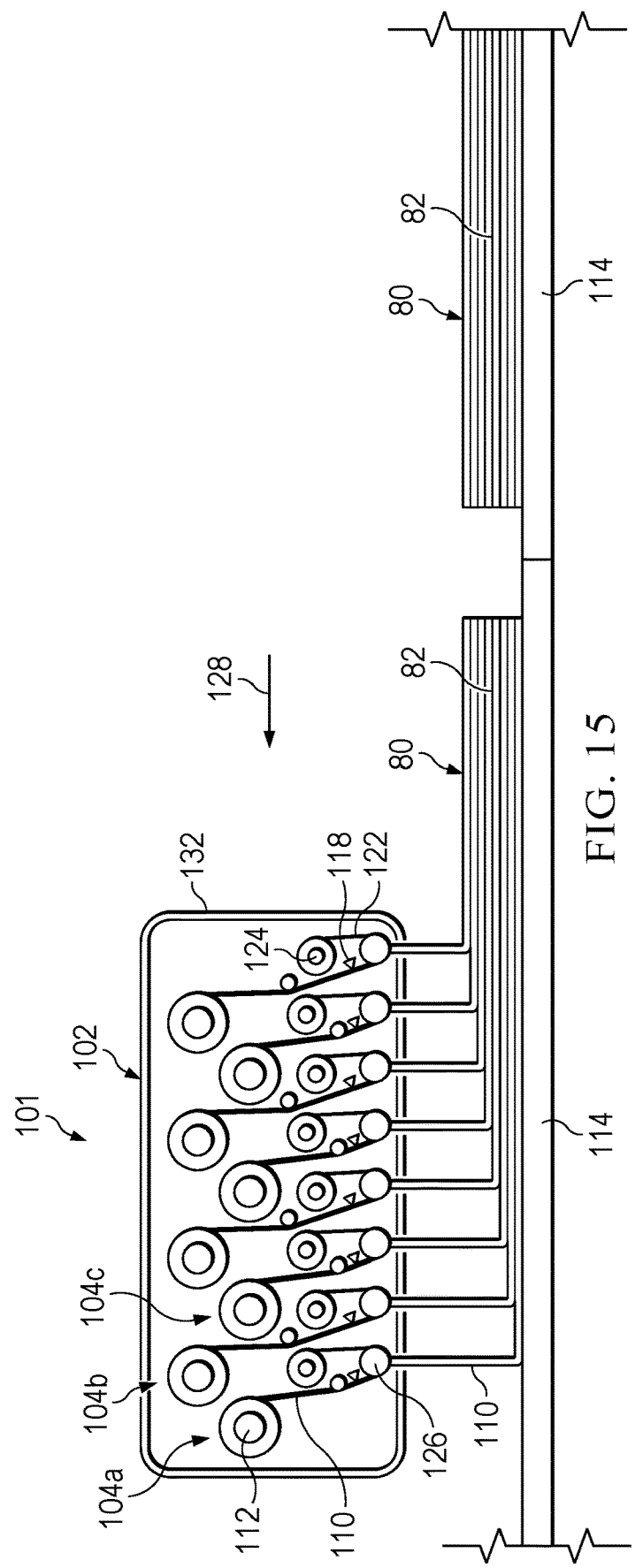
FIG. 15 is an illustration of a diagrammatic side view showing how the laminator simultaneously lays down multiple plies of the charge on a substrate.

Referring particularly to FIG. 14-16, as previously explained, the laminator 102 can lay up all of the plies 82 of the charge 80 in a single pass of the laminator 102 over the substrate 114. However, depending on the ply schedule and the degree of production efficiency that is required for a particular application, the charge 80 can be laid up by 2 or more passes of the laminator 102 over the substrate 114. For example, if a ply schedule calls for 32 plies 82, and the laminator 102 comprises 8 tape heads 104, then all of the plies 82 of the charge 80 can be laid up in 4 passes of the laminator 102 over the substrate 114. Alternatively, if the laminator 102 comprises 32 tape heads 104, then all of the plies of the charge 80 can be laid up by the laminator 102 in a single pass. Referring to FIG. 15, the tape heads 104 can be nested together to form a more compact laminator envelop. As shown in FIG. 16, the tape heads 104 are arranged in a row 115, one after another, aligned in series 87 along a common axis 130 so that the layers of tape 110 are likewise aligned with each other as they are being laid down to form the charge 80.

Figure 17:
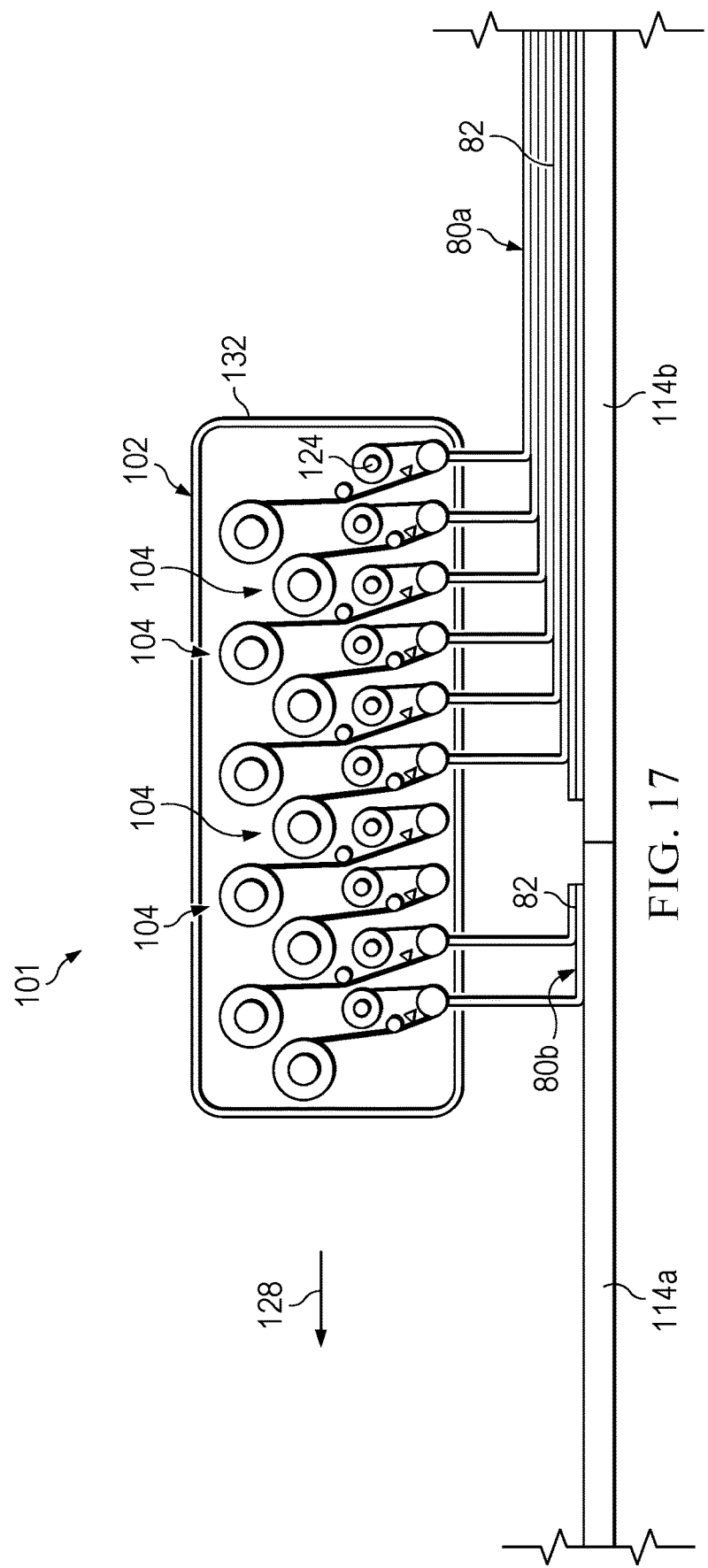
FIG. 17 is an illustration similar to FIG. 15 but showing how the laminator can lay up portions of two charges simultaneously.

Attention is now directed to FIG. 17 which shows a laminator 102 having ten tape heads 104 in the process of simultaneously laying up portions of two charges 80a, 80b on two different substrates 114a, 114b. On the right side of FIG. 17, six of the tape heads 104 are completing layup plies of the charge 80a, while at the same time, on the left side of the Figure, two of the tape heads 104 are beginning down to lay down plies of charge 80b. In this example, two of the tape heads 104 are inactive (not laying tape). As the laminator 102 continues its movement from right to left, laminator 102 completes laying up charge 80a, and the tape heads 104 that were either inactive or laying up charge 80a, begin laying down the plies 82 of charge 80b until it is completed.

The laminator 102 can continue laying up any number of different charges 80 simultaneously in this manner. The charges 80 may be identical or different from each other in terms of their ply schedules. Moreover, the charges 80a, 80b shown in FIG. 17 may comprise charge segments (discussed below) that are later joined together to form a single charge Actuation of the tape heads 104 is individually controlled by the controller 106 shown in FIG. 12. Since the tape heads 104 may be loaded with tape having differing fiber orientations, any of the tape heads 104 can be activated or the deactivated to begin or stop laying tape at any point in the travel of the laminator 102 over the substrate 114.

Figure 18:
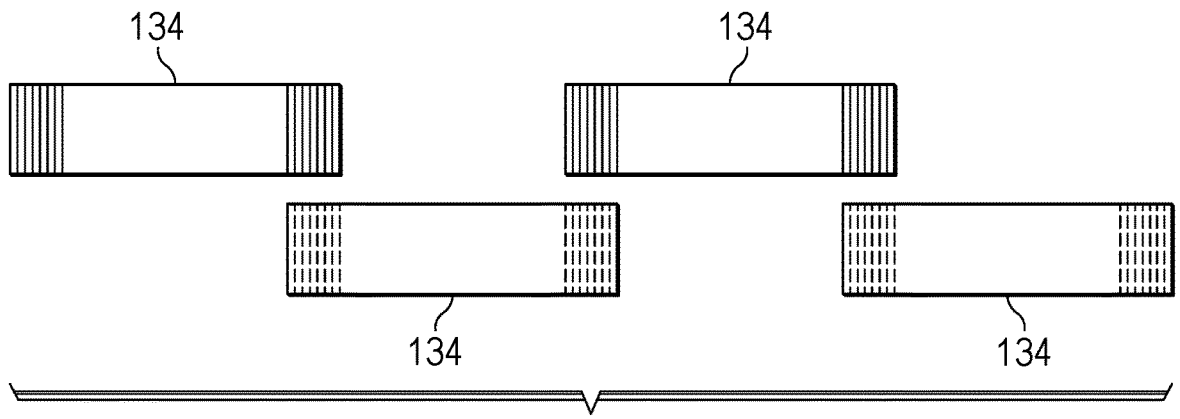
FIG. 18 is an illustration of a plan view of four individual charge segments prior to being joined together.
Figure 19:
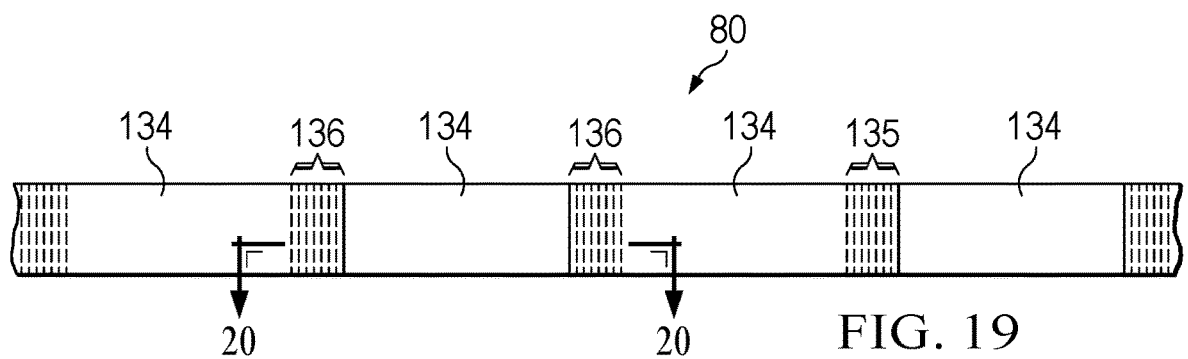
FIG. 19 is an illustration of a plan view showing the charge segments of FIG. 18 having been joined together into a complete charge.
Figure 20:
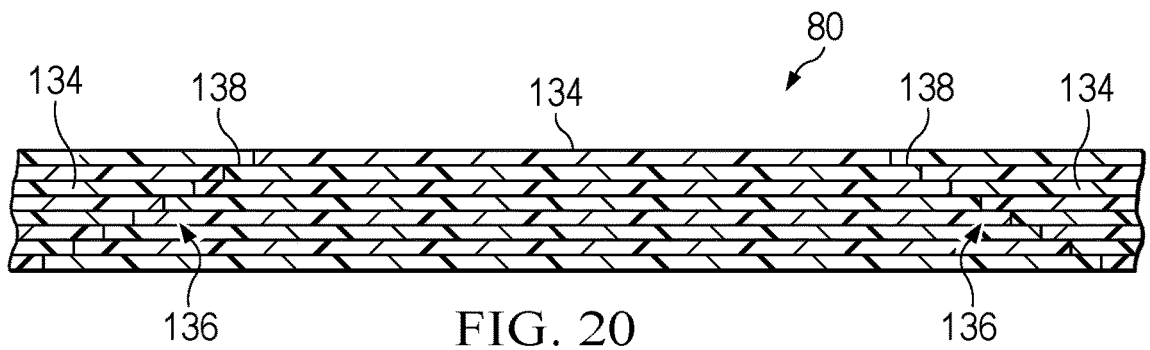
FIG. 20 is an illustration of a sectional view taken along the line 20-20 in FIG. 19.

Referring now to FIGS. 18-20, stringers 54 that are contoured and comprise a composite laminate may be produced using a plurality of overlapping charges segments 134 that are joined together to form a charge 80 that is complete. Each of the charge segments 134 comprises stack of plies 82 laid up according to a predetermined ply schedule that may include, for example, any number of 0°, +45°, −45° and 90° plies, although many other ply orientations are possible. The plies 82 in each of the charge segments 134 has a pattern of angled cuts 94 therein corresponding to the description of the examples previously described in connection with FIGS. 7-11.

In some examples, all of the charge segments 134 may have plies arranged according to the same ply schedule. In other words, all of the charge segments 134 may be substantially identical. In one example, the charge 80 may comprise two or more charge segments 134 in order to produce longer stringers 54 that can be accommodated by production equipment that is limited to forming charges 80 that are shorter. In other examples, however, the charge segments 134 may be different in terms of their ply schedules, fiber lengths, cut angles and/or cut patterns, in order to tailor the charge 80 along its length to meet local load demands and/or other conditions. For example, the charge segments 134 can be tailored and optimized to respectively meet local load demands and geometries of stringers 54 used in the inboard section 74, as well as the intermediate section 76 and also the outboard section 78 section 74, 76, 78 (FIG. 2) of the wing 44. Shorter charge segments 134 enhance the formability of a charge 80 in those areas of the stringer 54 that are highly contoured. The charge segments 134 may have the same or different lengths.

The charge segments 134 may be laid up with ply drop-offs 138 (FIG. 20) at one or both ends. Following layup, the charge segments 134 can be joined together as by co-curing at the joints 136. In the illustrated example, the charge segments 134 are connected by step lap joints, however any of a variety of other types of joints 136 may be used, depending upon the application. In some examples, each of the charge segments 134 comprises prepreg tape having a width that is equal to the width of the charge segments 134 however, in other examples, each one of the plies 82 may comprise multiple tape widths. The plies 82 of the charge segment 134 may be laid up either individually or all together substantially simultaneously by the laminator 102 previously described.

The charge 80 can be formed to a desired shape using any of various techniques. For example, referring to FIGS. 21 and 22, the charge 80 can be compression formed in a die set 139, comprising upper and lower dies 141, 143, respectively. As the charge 80 is being compressed between the upper and lower dies 141, 143, the die set 139 along with the charge 80 may be stretched using an applied force F. Stretching of the charge 80 as it is being formed assists in reducing wrinkling of the plies 82 in any contoured areas of the structure being formed. Similarly, the charge 80 may be LASH performed over one or more forming blocks in order to reduce ply wrinkling.

FIG. 23 broadly illustrates the overall steps of a method of making a charge 80 used to form a composite laminate structure such as a stringer 54. As shown at 140, the method comprises laying up a stack of plies 82 of fiber prepreg by laying down strips of fiber prepreg tape 110 on top of each other over a substrate 114 using a plurality of tape heads 104, such that all of the plies 82 of the stack are laid up simultaneously.

Figure 24:
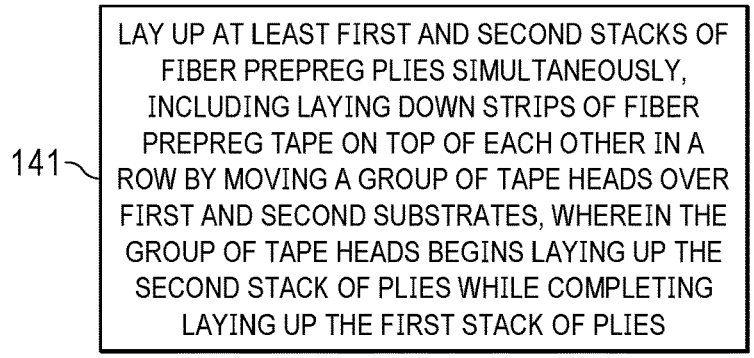
FIG. 24 is an illustration of a flow diagram of a method of making a contoured composite laminate structure

FIG. 24 illustrates another method for laying up a charge 80 used to form a composite laminate structure. As shown at 141, the method includes laying up at least first and second stacks of plies 82 of fiber prepreg simultaneously, including laying down strips of the tape 110 on top of each other in a row 115 by moving a group of tape heads 104 over first and second substrates 114, wherein the group of tape heads 104 begins laying up the second stack of plies while completing laying up the first stack of plies.

Figure 25:
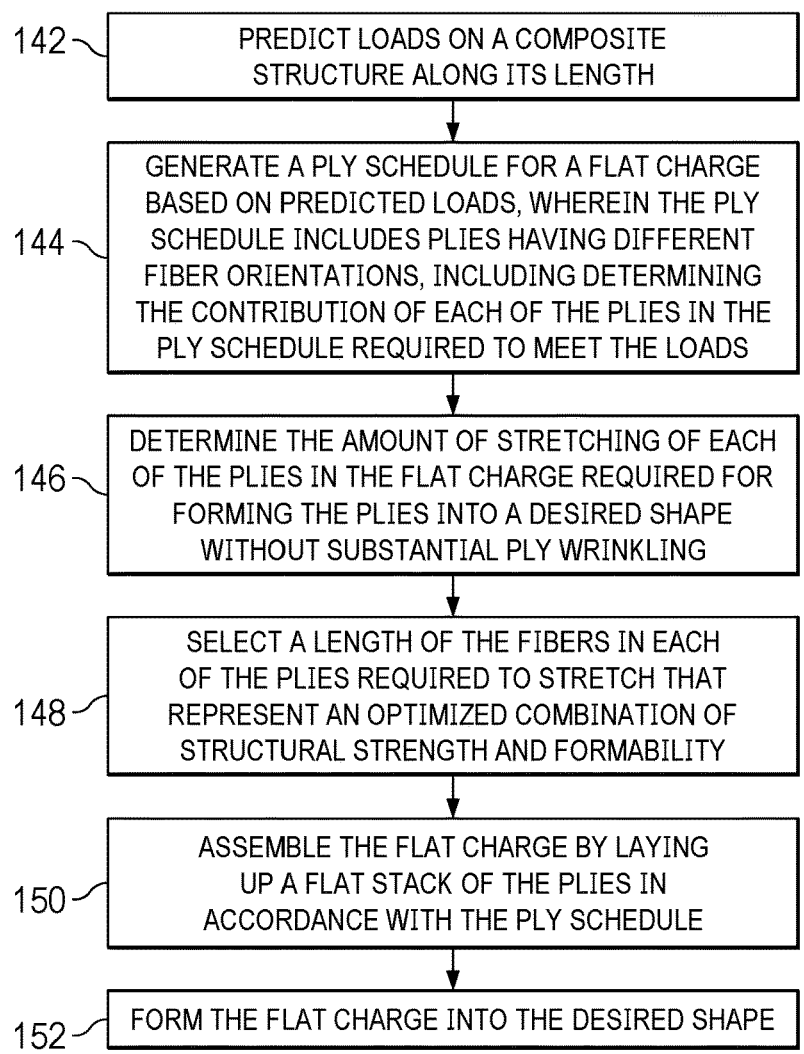
FIG. 25 is an illustration of a flow diagram of a method of making a contoured composite laminate structure.

Attention is now directed to FIG. 25 which illustrates a method of making a composite laminate structure. Beginning at 142, loads on the composite structure are predicted along its length. At 144, a ply schedule is generated for a fat charge based on the predicted loads. The ply schedule includes plies having different fiber orientations. A determination is made of the contribution of each of the plies required to meet the predicted loads. At 146, a determination is made of the amount each ply in the flat charge is required to stretch in order to form the plies into a desired shape without substantial ply wrinkling. At 148, the length of the fibers in each of the plies is selected that is required to stretch which represent an optimize combination of structural strength and formability. At 150, the flat charge is assembled by laying up a flat stack of the plies in accordance with the ply schedule. Finally, at 152 the flat charge is formed to the desired shape.

Figure 26:
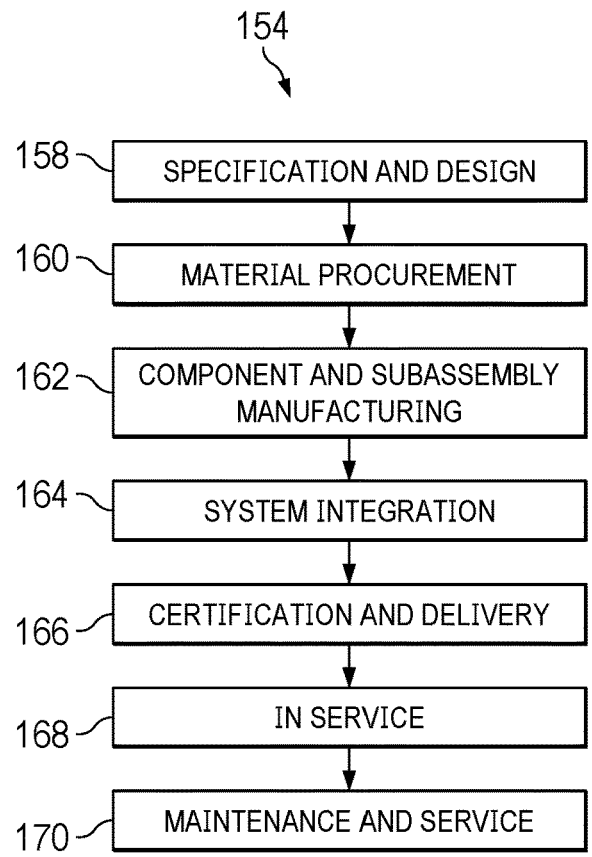
FIG. 26 is an illustration of a flow diagram of aircraft production and service methodology.
Figure 27:
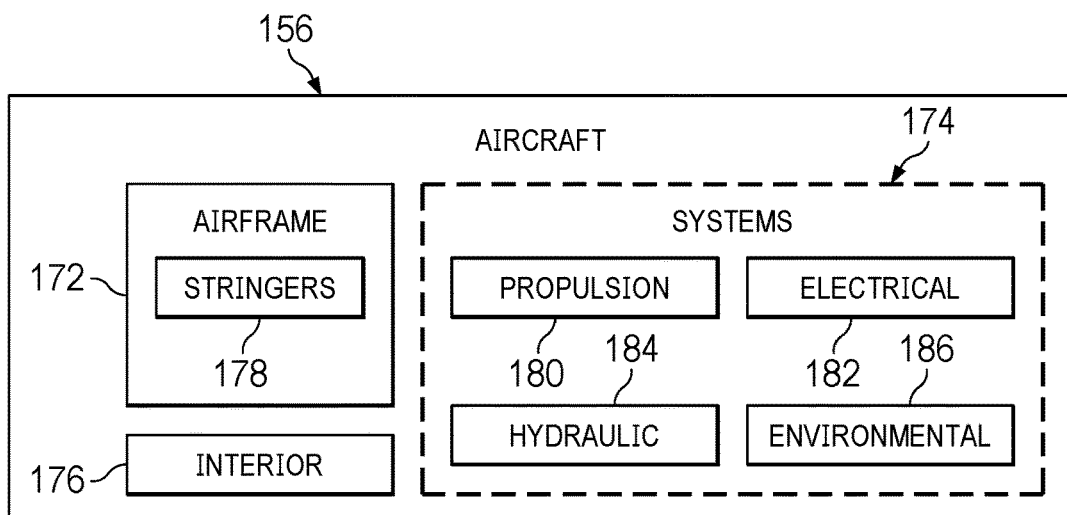
FIG. 27 is an illustration of a block diagram of an aircraft.

Examples of the disclosure may find use in a variety of potential applications, particularly in the transportation industry, including for example, aerospace, marine, and other application where composite laminate structures such as stiffeners used in aircraft may be used. Thus, referring now to FIGS. 26 and 27, examples of the disclosure may be used in the context of an aircraft manufacturing and service method 154 as shown in FIG. 26 and an aircraft 156 as shown in FIG. 27. Aircraft applications of the disclosed examples may include a variety of composite stringers and similar stiffeners which may have contours, curvatures, varying thicknesses or other out of plane features along their lengths. During pre-production, exemplary method 154 may include specification and design 158 of the aircraft 156 and material procurement 160. During production, component and subassembly manufacturing 162 and system integration 164 of the aircraft 156 takes place. Thereafter, the aircraft 156 may go through certification and delivery 166 in order to be placed in service 168. While in service by a customer, the aircraft 156 is scheduled for routine maintenance and service 170, which may also include modification, reconfiguration, refurbishment, and so on.

Each of the processes of method 154 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 27, the aircraft 156 produced by exemplary method 154 may include an airframe 172 with a plurality of systems 174 and an interior 176. The airframe 172 may include stringers 178 having one or more contours, curvatures or other out of plane features along their lengths. Examples of high-level systems 174 include one or more of a propulsion system 180, an electrical system 182, a hydraulic system 184 and an environmental system 186. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 154. For example, components or subassemblies used during component and subassembly manufacturing 162 may be fabricated or manufactured in a manner similar to components or subassemblies produced while the aircraft 156 is in service. Also, one or more apparatus examples, method examples, or a combination thereof may be utilized during component and subassembly manufacturing 162 and system integration 164, for example, by substantially expediting assembly of or reducing the cost of an aircraft 156. Similarly, one or more of apparatus examples, method examples, or a combination thereof may be utilized while the aircraft 156 is in service, for example and without limitation, to maintenance and service 170.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making composite charges used to form composite laminate structures, comprising:
    laying up at least first and second stacks of fiber prepreg plies simultaneously, including laying down strips of fiber prepreg tape on top of each other in a row by moving a group of tape heads over first and second substrates wherein the group of tape heads begin laying up the second stack of plies while completing laying up the first stack of plies.

2. The method of claim 1, wherein all of the plies of the first and second stacks are laid up in a single pass of the group of tape heads over the first and second substrates.

3. The method of claim 1, further comprising removing a backing paper on the fiber prepreg tape.

4. The method of claim 1, wherein 2 of the plies of the first stack and 6 of the plies of the second stack are laid up in a single pass of the group of tape heads over the first and second substrates.

5. A method of making a composite charge used to form a composite structure, comprising:
    laying up at least first and second stacks of fiber prepreg plies on a substrate simultaneously, including laying down strips of fiber prepreg tape on top of each other in a row by moving a group of tape heads over first and second substrates wherein the group of tape heads begin laying up the second stack of plies while completing laying up the first stack of plies, and
    compacting strips of fiber prepreg tape in series as the strips of fiber prepreg tape are being laid down.

6. The method of claim 5, wherein:
    compacting strips of fiber prepreg tape includes compacting the strips of fiber prepreg tape simultaneously.

7. The method of claim 5, further comprising removing a backing paper on the fiber prepreg tape before the fiber prepreg tape is compacted.

8. The method of claim 5, wherein:
    laying down strips of fiber prepreg tape includes passing a group of tape heads over the substrate, and
    wherein all of the fiber prepreg plies are laid up on the substrate in a single pass of the group of tape heads over the substrate.

9. A method of making composite charges used to form composite laminate structures, comprising:
    laying up at least first and second stacks of fiber prepreg plies simultaneously, including laying down strips of fiber prepreg tape on top of each other in a row by moving a group of tape heads over first and second substrates wherein the group of tape heads begin laying up the second stack of plies while simultaneously completing laying up the first stack of plies.

10. The method of claim 9, wherein all of the plies of the first and second stacks are laid up in a single pass of the group of tape heads over the first and second substrates.

11. The method of claim 9, further comprising removing a backing paper on the fiber prepreg tape.

12. The method of claim 9, wherein 2 of the plies of the first stack and 6 of the plies of the second stack are laid up in a single pass of the group of tape heads over the first and second substrates.

13. The method of claim 12, further comprising removing a backing paper on the fiber prepreg tape.

14. A method of making composite charges used to form composite laminate structures, comprising:
    laying up at least first and second stacks of fiber prepreg plies substantially simultaneously, including laying down strips of fiber prepreg tape on top of each other in a row by moving a group of tape heads over first and second substrates wherein the group of tape heads begin laying up the second stack of plies while completing laying up the first stack of plies.

15. The method of claim 14, wherein all of the plies of the first and second stacks are laid up in a single pass of the group of tape heads over the first and second substrates.

16. The method of claim 14, further comprising removing a backing paper on the fiber prepreg tape.

17. The method of claim 14, wherein 2 of the plies of the first stack and 6 of the plies of the second stack are laid up in a single pass of the group of tape heads over the first and second substrates.

18. The method of claim 17, further comprising removing a backing paper on the fiber prepreg tape.

19. The method of claim 4, further comprising removing a backing paper on the fiber prepreg tape.

* * * * *